United States Patent [19]

Levanon

[11] Patent Number: 6,078,284
[45] Date of Patent: *Jun. 20, 2000

[54] PASSIVE POSITION DETERMINATION USING TWO LOW-EARTH ORBIT SATELLITES

[75] Inventor: Nadav Levanon, Ramat Gan, Israel

[73] Assignee: QUALCOMM Incorporated, San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/723,722

[22] Filed: Sep. 30, 1996

[51] Int. Cl.$^7$ ............................ G01S 5/01; H04B 7/185
[52] U.S. Cl. ................................ 342/357.16; 455/12.1
[58] Field of Search .......................... 342/357, 457; 455/12.1, 13.1; 701/213

[56] References Cited

U.S. PATENT DOCUMENTS

| | | | |
|---|---|---|---|
| 5,412,389 | 5/1995 | Olds | 342/357 |
| 5,548,801 | 8/1996 | Araki et al. | 455/13.1 |
| 5,552,795 | 9/1996 | Tayloe et al. | 342/357 |
| 5,619,525 | 4/1997 | Wiedeman et al. | 375/200 |
| 5,634,190 | 5/1997 | Wiedeman et al. | 455/13.1 |

FOREIGN PATENT DOCUMENTS

| | | | |
|---|---|---|---|
| 0546758 | 6/1993 | European Pat. Off. | H04Q 7/04 |
| 8801392 | 2/1988 | WIPO | G01S 13/78 |
| 9621162 | 7/1996 | WIPO | G01S 5/02 |

*Primary Examiner*—Gregory C. Issing
*Attorney, Agent, or Firm*—Russell B. Miller; Gregory D. Ogrod

[57] ABSTRACT

A system and method for passively determining the position of a user terminal (for example, a mobile wireless telephone) in a low-Earth orbit satellite communications system. The system includes a user terminal, at least two satellites with known positions and known velocities, and a gateway (that is, a terrestrial base station) for communicating with the user terminal through the satellites. The method includes the steps of determining a range difference parameter and a range-rate difference parameter. A range difference parameter represents the difference between (1) the distance between a first one of the satellites and the user terminal and (2) the distance between a second one of the satellites and the user terminal. A range-rate difference parameter represents the difference between (a) a relative radial velocity between a first one of the satellites and the user terminal and (b) a relative radial velocity between a second one of the satellites and the user terminal. The position of the user terminal on the Earth's surface is then determined based on the known positions and known velocities of the satellites, the range difference parameter, and the range-rate difference parameter.

19 Claims, 10 Drawing Sheets

PASSIVE POSITION DETERMINATION USING TWO LOW-EARTH ORBIT SATELLITES

CROSS-REFERENCE TO RELATED APPLICATIONS

This application is related to commonly-owned applications, filed concurrently herewith, entitled "*Position Determination Using One Low-Earth Orbit Satellite*" having application Ser. No. 08/723,751 (to be assigned, Attorney Docket Number PA286), "*Unambiguous Position Determination Using Two Low-Earth Orbit Satellites*" having application Ser. No. 08/723,725 (to be assigned, Attorney Docket Number PA278), and "*Time And Frequency Precorrection For Non-Geostationary Satellite Systems*" having application Ser. No. 08/723,490 (to be assigned, Attorney Docket Number PA338), "*Ambiguity Resolution for Ambiguous Position Solutions Using Satellite Beams*" having application Ser. No. 08/723,723 (to be assigned, Attorney Docket Number PA342), and "*Determination Of Frequency Offsets In Communication Systems*" having application Ser. No. 08/723,724 (to be assigned, Attorney Docket Number PA300), which are incorporated herein by reference, which are incorporated herein by reference.

BACKGROUND OF THE INVENTION

I. Field of the Invention

The present invention relates generally to object position determination using satellites. More specifically, the present invention relates to a method for determining the position of a user terminal in a satellite communications system using characteristics of the communications signals.

II. Related Art

A typical satellite-based communications system comprises at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system.

A variety of multiple access communications systems have been developed for transferring information among a large number of system users. These techniques include time division multiple access (TDMA), frequency division multiple access (FDMA), and code division multiple access (CDMA) spread-spectrum techniques, the basics of which are well known in the art. The use of CDMA techniques in a multiple access communications system is disclosed in U.S. Pat. No. 4,901,307, which issued Feb. 13, 1990, entitled "*Spread Spectrum Multiple Access Communication System Using Satellite Or Terrestrial Repeaters*," and U.S. patent application Ser. No. 08/368,570, filed Jan. 4, 1995, entitled "*Method And Apparatus For Using Full Spectrum Transmitted Power In A Spread Spectrum Communication System For Tracking Individual Recipient Phase Time And Energy*," which are both assigned to the assignee of the present invention, and are incorporated herein by reference.

The above-mentioned patent documents disclose multiple access communications systems in which a large number of generally mobile or remote system users employ user terminals to communicate with other system users or users of other connected systems, such as a public telephone switching network. The user terminals communicate through gateways and satellites using CDMA spread-spectrum type communications signals.

Communications satellites form beams which illuminate a "spot" produced by projecting satellite communications signals onto the Earth's surface. A typical satellite beam pattern for a spot comprises a number of beams arranged in a predetermined coverage pattern. Typically, each beam comprises a number of so-called sub-beams (also referred to as CDMA channels) covering a common geographic area, each occupying a different frequency band.

In a typical spread-spectrum communications system, a set of preselected pseudorandom noise (PN) code sequences is used to modulate (i.e., "spread") information signals over a predetermined spectral band prior to modulation onto a carrier signal for transmission as communications signals. PN spreading, a method of spread-spectrum transmission that is well known in the art, produces a signal for transmission that has a bandwidth much greater than that of the data signal. In a forward communications link (that is, in a communications link originating at a gateway and terminating at a user terminal), PN spreading codes or binary sequences are used to discriminate between signals transmitted by a gateway over different beams, and to discriminate between multipath signals. These PN codes are typically shared by all communications signals within a given sub-beam.

In a typical CDMA spread-spectrum system, channelizing codes are used to discriminate between signals intended for particular user terminals transmitted within a satellite beam on the forward link. That is, a unique orthogonal channel is provided for each user terminal on the forward link by using a unique "channelizing" orthogonal code. Walsh functions are generally used to implement the channelizing codes, with a typical length being on the order of 64 code chips for terrestrial systems and 128 code chips for satellite systems.

Typical CDMA spread-spectrum communications systems, such as disclosed in U.S. Pat. No. 4,901,307, contemplate the use of coherent modulation and demodulation for forward link user terminal communications. In communications systems using this approach, a "pilot" carrier signal (hereinafter referred to as a "pilot signal") is used as a coherent phase reference for forward links. That is, a pilot signal, which typically contains no data modulation, is transmitted by a gateway throughout a region of coverage. A single pilot signal is typically transmitted by each gateway for each beam used for each frequency used. These pilot signals are shared by all user terminals receiving signals from the gateway.

Pilot signals are used by user terminals to obtain initial system synchronization and time, frequency, and phase tracking of other signals transmitted by the gateway. Phase information obtained from tracking a pilot signal carrier is used as a carrier phase reference for coherent demodulation of other system signals or traffic signals. This technique allows many traffic signals to share a common pilot signal as a phase reference, providing for a less costly and more efficient tracking mechanism.

When a user terminal is not involved in a communications session (that is, the user terminal is not receiving or transmitting traffic signals), the gateway can convey information to that particular user terminal using a signal known as a paging signal. For example, when a call has been placed to a particular mobile phone, the gateway alerts the mobile phone by means of a paging signal. Paging signals are also used to distribute traffic channel assignments, access channel assignments, and system overhead information.

A user terminal can respond to a paging signal by sending an access signal or access probe over the reverse link (that is, the communications link originating at the user terminal and terminating at the gateway). The access signal is also used when a user terminal originates a call.

When communications are required with a user terminal, the communications system may need to determine the position of the user terminal. The need for user terminal position information stems from several considerations. One consideration is that the system should select an appropriate gateway for providing the communications link. One aspect of this consideration is allocation of a communications link to the proper service provider (for example, a telephone company). A service provider is typically assigned a particular geographic territory, and handles all calls with users in that territory. When communications are required with a particular user terminal, the communications system can allocate the call to a service provider based on the territory within which the user terminal is located. In order to determine the appropriate territory, the communications system requires the position of the user terminal. A similar consideration arises when calls must be allocated to service providers based on political boundaries or contracted services.

When a satellite communications system attempts to locate a particular user terminal, it limits the scope of its search by beginning with the last known position of that user terminal. The search can be made more efficient by improving the accuracy of the information regarding the user's last known position. One approach is to regularly determine the position of the user terminal by having the user terminal broadcast a "beacon" signal, or through a two-way exchange of communications signals with the user terminal. Because the user terminal is required to transmit signals, this approach is known as "active" position determination. Several position determination systems are known.

One conventional approach is that employed by the U.S. Navy's TRANSIT system. In that system, the user terminal performs continuous Doppler measurements of a signal broadcast by a low-Earth orbit (LEO) satellite. The measurements continue for several minutes. The system usually requires two passes of the satellite, necessitating a wait of more than 100 minutes.

Another conventional approach is that employed by the ARGOS and SARSAT (Search and Rescue Satellite) systems. In that approach, the user terminal transmits an intermittent beacon signal to a receiver on the satellite, which makes frequency measurements of the signal. If the satellite receives more than four beacon signals from the user terminal, it can usually solve for the user terminal's position. Because the beacon signal is intermittent, an extended Doppler measurement, such as that performed by the TRANSIT system, is unavailable. The primary disadvantage with this approach is that the user terminal must transmit a beacon signal.

Another conventional approach is that employed by the Global Positioning System (GPS). In that approach, each satellite broadcasts a time-stamped signal that includes the satellite's ephemeris. When the user terminal receives a GPS signal, the user terminal measures the transmission delay relative to its own clock and determines a pseudo-range to the transmitting satellite's position. The GPS system requires three satellites for two-dimensional positioning, and a fourth satellite for three-dimensional positioning. The primary disadvantage of the GPS approach is that at least three satellites are required for position determination.

One disadvantage of all of the above-described approaches is that the user terminal must have a separate transmitter or receiver, in addition to that required to process communication signals, in order to use those approaches.

Another conventional approach is that disclosed in commonly-owned U.S. Pat. No. 5,126,748, which issued Jun. 30, 1992, entitled "Dual Satellite Navigation System And Method." This approach employs two satellites to actively determine the position of a user terminal through trilateration. While useful, the solution obtained with this method is ambiguous, providing two possible positions. Further information is needed to resolve the ambiguity.

An active position determination method consumes communications bandwidth in a manner that does not generate revenues. Also, the user terminal is required to make regular transmissions. This constitutes a significant power drain on the power source (such as a battery) for a mobile or hand-held user terminal.

What is needed and desirable, therefore, is a satellite-based position determination system where the user terminal can determine its position passively.

SUMMARY OF THE INVENTION

The present invention is a system and method for passively and unambiguously determining the position of a user terminal (for example, a mobile telephone) in a satellite communications system, such as a low-Earth orbit satellite communications system. The position determination of the present invention is termed "passive" because the user terminal is not required to transmit. The system includes a user terminal, at least two satellites with known positions and known velocities, and a gateway (that is, a terrestrial base station) for communicating with the user terminal through the satellites. Each satellite broadcasts information regarding its position (also known as ephemeris or ephemerides). The method includes the steps of determining parameters that describe the spatial and temporal relationships between the user terminal and the satellites and solving for the position of the user terminal using the parameters and the known positions and velocities of the satellites.

Two parameters are used: range difference and range-rate difference. The range difference parameter represents the difference between (1) a distance between a user terminal and a first satellite and (2) a distance between that user terminal and a second satellite. The range-rate difference parameter represents the difference between (1) a relative radial velocity between a user terminal and a first satellite and (2) a relative radial velocity between that user terminal and a second satellite.

In a preferred embodiment of the present invention, an iterative weighted Gauss-Newton least-squares method is used to solve for the position of the user terminal based on the parameters used and the known positions and known velocities of the satellites.

A feature of the present invention is its use as part of a method termed "distance-based registration". According to this method, the user terminal determines its position passively, as described above, at regular intervals. When the user terminal determines that its position has changed substantially from the last actively-determined position, it "registers" with a gateway. In response, the gateway actively determines the user terminal's new position. In this manner, the satellite communications system maintains timely and accurate position information for a user terminal without requiring the user terminal to make unnecessary transmissions.

One advantage of the present invention is that it permits a user terminal to determine its position passively using only two satellites, such as LEO satellites.

Another advantage of the present invention is that it permits a user terminal to determine when to inform the satellite communications system of a change in its position.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digits of a reference number identify the drawing in which the reference number first appears.

DETAILED DESCRIPTION OF THE PREFERRED EMBODIMENTS

I. Introduction

The present invention is a system and method for passive position determination of a user terminal in a satellite communications system using at least two low-Earth orbit (LEO) satellites. As would be apparent to one skilled in the relevant art, the concept of the present invention may be applied to satellite systems in which the satellites travel in non-LEO orbits if the relative motion between the satellites and the user terminal is sufficient to facilitate the range-rate measurements described below.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

The present invention will be described in five parts. First, a typical satellite communications system is described. Second, the parameters employed by the system's positioning method are described. Third, the positioning method is described in terms of its physical representations. Fourth, the execution of the positioning method is described. Finally, the "distance-based registration" feature is described.

II. A Typical Satellite Communications System

Figure 1:
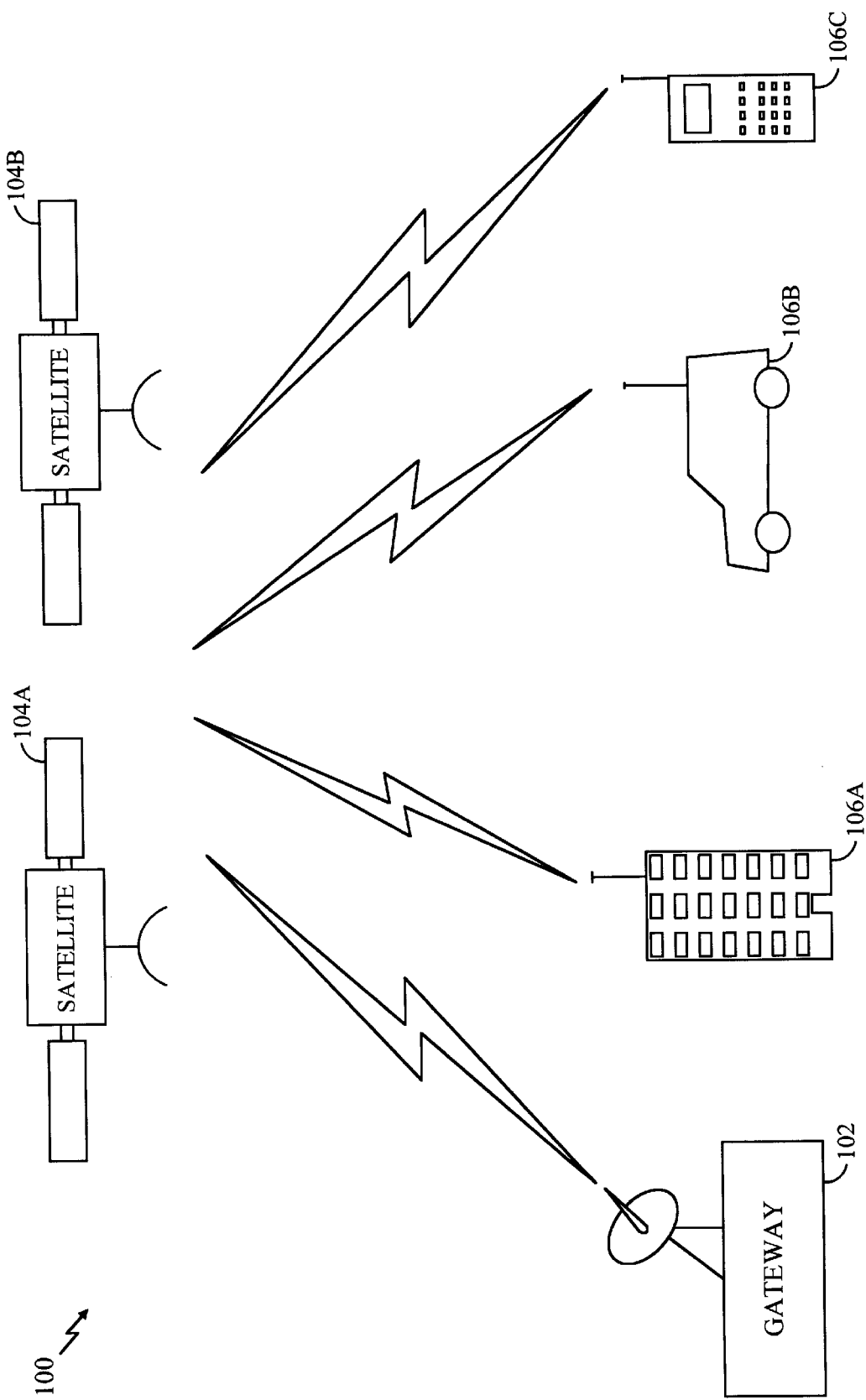
FIG. 1 depicts a typical satellite communication system.

FIG. 1 depicts a typical satellite communication system 100. Satellite communication system 100 comprises gateway 102, satellites 104A and 104B, and user terminals 106. User terminals 106 are generally of three types: fixed user terminals 106A, which are typically mounted in permanent structures; mobile user terminals 106B, which are typically mounted in vehicles; and portable user terminals 106C, which are typically hand-held. Gateway 102 communicates with user terminals 106 through satellites 104A and 104B.

Figure 2:
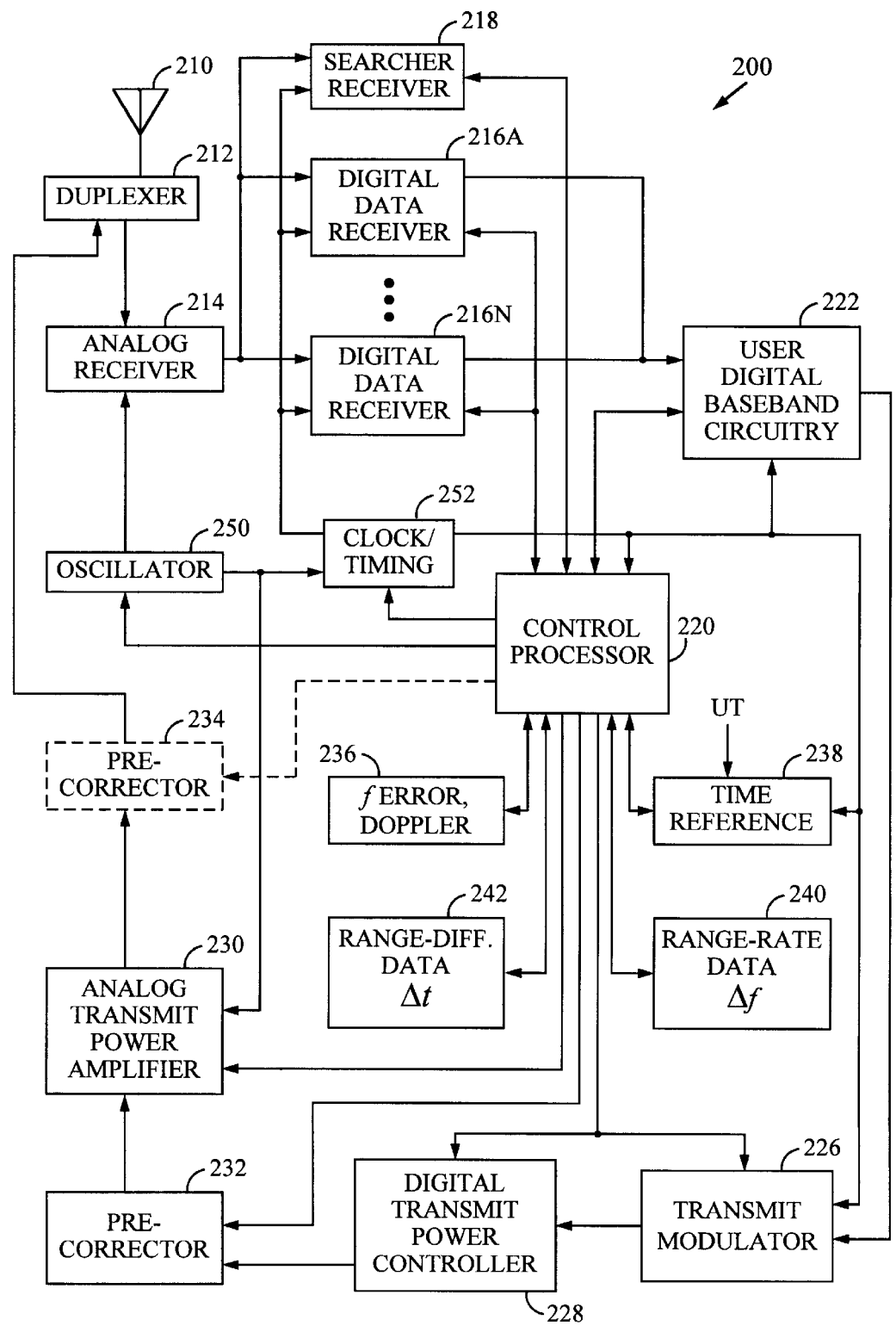
FIG. 2 is a block diagram of an exemplary transceiver for use in a user terminal.

An exemplary transceiver 200 for use in a user terminal 106 is illustrated in FIG. 2. Transceiver 200 uses at least one antenna 210 for receiving communication signals which are transferred to an analog receiver 214, where they are downconverted, amplified, and digitized. A duplexer element 212 is usually used to allow the same antenna to serve both transmit and receive functions. However, some systems employ separate antennas for operating at different frequencies.

Digital communication signals output by analog receiver 214 are transferred to at least one digital data receiver 216A and at least one digital searcher receiver 218. Additional digital data receivers 216B–216N can be used in a "rake" configuration to obtain desired levels of signal diversity, depending on the acceptable level of unit complexity, as would be apparent to one skilled in the relevant art. A receiver configured in such a manner is called a "rake receiver," and each digital data receiver 216 is called a "finger."

The fingers of the rake receiver are not only used for signal diversity, but also to receive signals from multiple satellites. Therefore, for user terminals implementing the two satellite position determination technique of the present invention, at least two digital data receivers 216A–216N are used to receive signals from the two satellites. In addition, one or additional searcher receivers 218 can be used to provide for high speed signal acquisition, or one or more can be time shared for this task.

At least one user terminal control processor 220 is electrically coupled to digital data receivers 216A–216N and searcher receiver 218. Control processor 220 provides, among other functions, basic signal processing, timing, power and handoff control or coordination and selection of frequency used for signal carriers. Another basic control function often performed by control processor 220 is the selection or manipulation of PN code sequences or orthogonal functions to be used for processing communication signal waveforms. Control processor 220 signal processing can include a determination of the parameters employed by the present invention. Such computations of signal parameters, such as relative timing and frequency, can include the use of additional or separate dedicated circuitry to provide increased efficiency or speed in measurements or improved allocation of control processing resources.

Outputs for digital data receivers 216A–216N are electrically coupled to user digital baseband circuitry 222 within the user terminal. User digital baseband circuitry 222 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the user baseband circuitry using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communication signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Transceiver 200 can also employ one or more precorrection elements or precorrectors 232 and 234. The operation of these precorrectors is disclosed in a copending, commonly-owned application entitled *"Time And Frequency Precorrection For Non-Geostationary Satellite Systems"* having application number (to be assigned, Attorney Docket Number PA338), which is incorporated herein by reference. Preferably, precorrection occurs at the output of digital power controller 228 at baseband frequency. The baseband spectral information including the frequency adjustment is translated to the appropriate center frequency during up-conversion performed in transmit power amplifier 230. The precorrection or frequency adjustment is accomplished using techniques known in the art. For example, the precorrection can be effected by a complex signal rotation, which is equivalent to multiplying the signal by a factor of $e^{j\omega t}$, where $\omega$ is computed on the basis of known satellite ephemerides and desired channel frequency. This is very useful where communication signals are processed as in-phase (I) and quadrature phase (Q) channels. A direct digital synthesis device can be used to generate some of the rotation products. Alternatively, a coordinate rotation digital computation element can be used that employs binary shifts, adds, and subtracts to perform a series of discrete rotations, resulting in the desired overall rotation. Such techniques and related hardware are well understood in the art.

As an alternative, precorrection element 234 can be disposed in the transmission path on the output of transmit power amplifier 230, to adjust the frequency of the outgoing signal. This can be accomplished using well known techniques, such as up- or down-conversion of the transmission waveform. However, changing the frequency on the output of the analog transmitter can be more difficult because there is often a series of filters used to shape the waveform, and changes at this juncture may interfere with the filtering process. Alternatively, precorrection element 234 can form part of a frequency selection or control mechanism for the analog up-conversion and modulation stage (230) of the user terminal so that an appropriately adjusted frequency is used to convert the digital signal to a desired transmission frequency in one step.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220.

Digital data receivers 216A–N and searcher receivers 218 are configured with signal correlation elements to demodulate and track specific signals. Searcher receivers 218 are used to search for pilot signals, or other relatively fixed pattern strong signals, while data receivers 216A–N are used to track pilot signals or demodulate other signals associated with detected pilot signals. Therefore, the outputs of these units can be monitored to provide information employed to compute the parameters of the present invention. Information on the measurements made by user terminal 106 on received communication signals or shared resource signals can be sent to the gateway using a variety of techniques known in the art. For example, the information can be transferred as a separate data signal or be appended to other messages prepared by user digital baseband circuitry 222. Data receivers 216 (A–N) also employ frequency tracking elements that can be monitored to provide current frequency and timing information to control processor 220 for signals being demodulated. This is discussed further below with reference to FIGS. 4 and 5.

Control processor 220 uses such information to determine to what extent the received signals are offset from an expected frequency, based on a local oscillator frequency, when scaled to the same frequency band, as appropriate. This and other information related to frequency offsets, errors and Doppler shifts, can be stored in one or more error/Doppler storage or memory elements 236, as desired. This information can be used by control processor 220 to adjust its operating frequency, or can be transferred to gateways using various communication signals.

At least one time reference element 238 is used to generate and store chronological information such as the date and time of day to assist in determining satellite positions. The time can be stored and updated periodically. The time may also be supplied periodically by a gateway. In addition, the current time is stored each time a user terminal enters an inactive mode such as when it is "turned off". This time value is used in conjunction with the "turn on" time to determine various time dependent signal parameters and user terminal position changes.

Additional, storage or memory elements 240 and 242 can be used to store specific information about parameters discussed in further detail below. For example, a memory element 240 can store user terminal measurements made relative to a range-rate parameter, such as differences in relative frequency offsets between two arriving signals. A memory element 242 could be used to store user terminal measurements relative to a range difference parameter, such as differences in the time of arrival for two signals. These memory elements use structure and circuits well known in the art and can be formed either as distinct or separate elements or as a larger unified structure in which this information is stored in a controlled manner, for later retrieval.

As shown in FIG. 2, a local or reference oscillator 250 is used as a reference for the analog receiver 214 to down convert the incoming signal to baseband at the desired frequency. It can also be employed in multiple intermediate conversion steps, as desired, until the signal reaches the desired baseband frequency. As shown, oscillator 250 is also used as a reference for analog transmitter 230, for up-conversion from baseband to the desired carrier frequency for reverse link transmissions, and as a frequency standard or reference for a timing circuit 252. Timing circuit 252 generates timing signals for other stages or processing elements within user terminal 200 such as time tracking circuits, the correlators in digital receivers 216A–N and 218, transmit modulator 226, time reference element 238, and control processor 220. Timing circuit 252 can also be configured to produce delays for retarding or advancing in the relative timing of timing or clock signals, under processor control. That is, time tracking can be adjusted by predetermined amounts. This also allows the application of codes to be advanced or retarded from "normal" timing, typically by one or more chip periods, so that PN codes or chips making up the codes can be applied with different timing, as desired.

Figure 3:
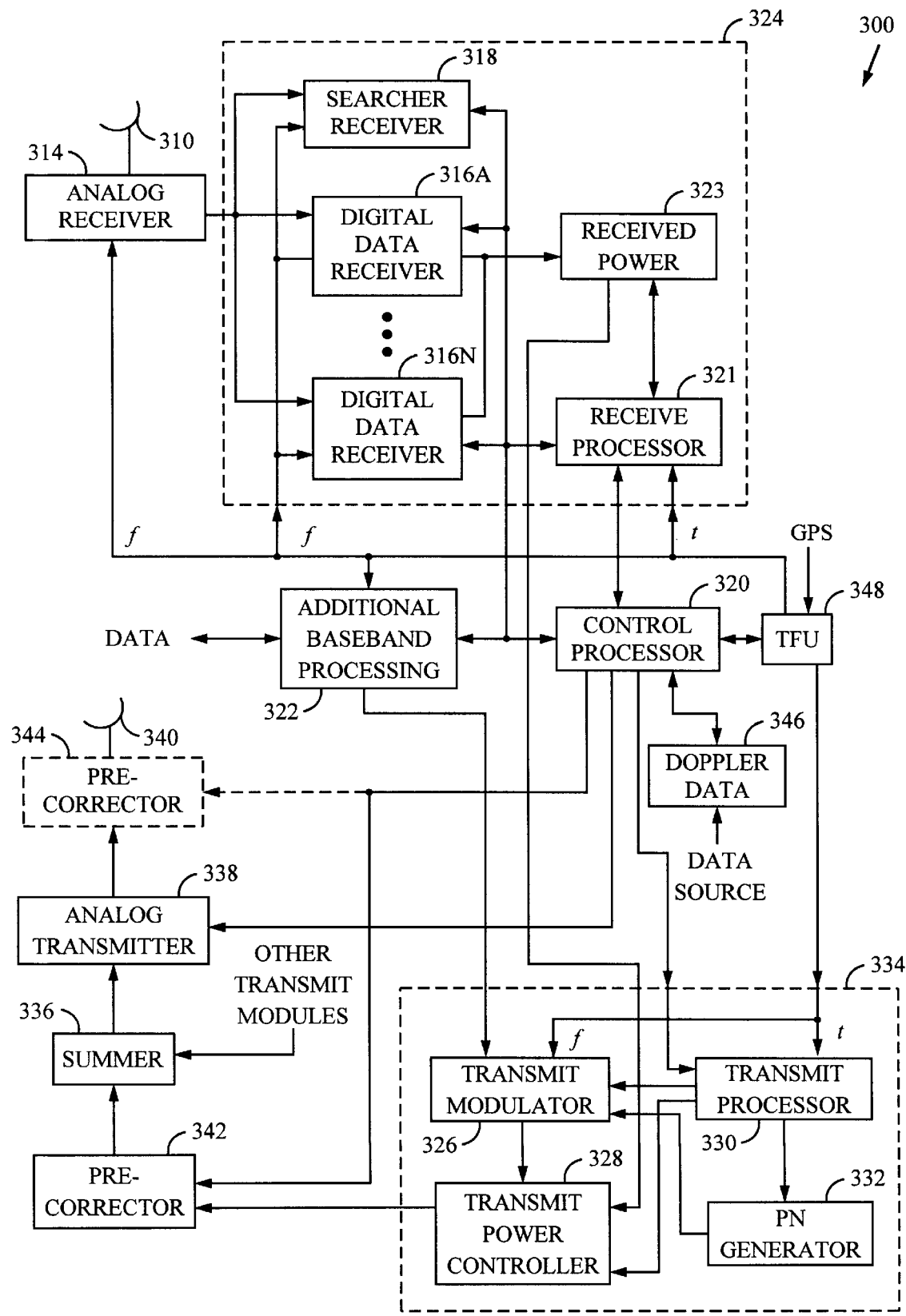
FIG. 3 is a block diagram of an exemplary transmission and reception apparatus for use in a gateway.

An exemplary transmission and reception apparatus 300 for use in a gateway 102 is illustrated in FIG. 3. The portion of gateway 102 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 102 and one user terminal 106, although certain variations are known in the art. One analog receiver 314 can provide inputs for many digital receiver modules 324, and a number of such modules are typically used in gateways 102 to accommodate all of the satellite beams and possible diversity mode signals being handled at any given time. Each digital receiver module 324 has one or more digital data receivers 316 and searcher receivers 318. Searcher receiver 318 generally searches for appropriate diversity modes of signals other than pilot signals, and several searchers can be used in parallel to increase searching speed. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals 106 are each electrically coupled to one or more appropriate transmit modules 334. A typical gateway uses a number of such transmit modules 334 to provide service to many user terminals 106 simultaneously, and for several satellites and beams simultaneously. The number of transmission modules 334 used by gateway 102 is determined by factors well known in the art, including system complexity, number of satellites usually in view, user capacity, degree of diversity chosen, and the like.

Each transmit module 334 includes a transmit modulator 326 which spread-spectrum modulates data for transmission and has an output electrically coupled to a digital transmit power controller 328, which controls the transmission power used for the outgoing digital signal. Digital transmit power controller 328 generally applies a minimum level of power for purposes of interference reduction and resource allocation, but applies appropriate levels of power when needed to compensate for attenuation in the transmission path and other path transfer characteristics. A PN generator 332 is used by transmit modulator 326 in spreading the signals. This code generation can also form a functional part of one or more control processors or storage elements used in gateway 102.

The output of transmit power controller 328 is transferred to a summer 336 where it is summed with the outputs from other transmit power control circuits. Those outputs are signals for transmission to other user terminals 106 at the same frequency and within the same beam as the output of transmit power controller 328. The output of summer 336 is provided to an analog transmitter 338 for digital-to-analog conversion, conversion to the appropriate RF carrier frequency, further amplification, filtering, and output to one or more antennas 340 for radiating to user terminals 106. Antennas 310 and 340 may be the same antennas depending on the complexity and configuration of the communication system.

At least one gateway control processor 320 is electrically coupled to receiver modules 324, transmit modules 334, and baseband circuitry 322. These units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers or modules for use in user communications. Further, control processor 320 can be used to compute the parameters and execute the positioning method of the present invention.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure. That is, the orthogonal function used to form the pilot signal channel generally has a constant value, such as all 1's or 0's, or a well known repetitive pattern of interspersed 1's and 0's.

While control processor 320 can be electrically coupled directly to the elements of a module, such as transmit module 334 or receive module 324, each module generally comprises a module-specific processor, such as transmit processor 330 or receive processor 321, which controls the elements of that module. Thus, in a preferred embodiment, control processor 320 is electrically coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, synchronization, paging signals, and traffic channel signals, and their respective coupling to power controller 328. Receive processor 321 controls searching, PN spreading codes for demodulation and monitoring received power. Processor 321 can also be used in determining signal parameters employed in the method of the present invention, or can detect and transfer information received from the user terminal regarding such parameters, thereby decreasing the burden on control processor 320.

In order to implement embodiments of the present invention, one or more precorrectors or frequency precorrection elements 342 and 344 may be used. Preferably, a precorrection element 342 is used to adjust the frequency of the digital output of digital power controller 328 at baseband frequency. As in the user terminal, baseband spectral information including the frequency adjustment is translated to the appropriate center frequency during the up-conversion performed in analog transmitter 338. The frequency precorrection is accomplished using techniques known in the art, such as the complex signal rotation discussed above, where the angle of rotation is computed on the basis of known satellite ephemerides and desired channel frequency. As in the user terminal, other signal rotation techniques and related hardware can be used without departing from the spirit and scope of the present invention.

In addition to frequency precorrection, there may be a desire to have time precorrection, to alter the relative timing of signals, or PN codes. This is generally accomplished by adjusting either code generation and timing or other signal parameter timing when a signal is generated at baseband and prior to output by power controller 328. For example, controller 320 can determine when codes are generated, and their relative timing and application to signals, as well as when signals are acted upon by transmit modulator 326 and are transmitted to various satellites by power controller 328. However, known time precorrection elements or circuits, either forming a part of, or as separate units (not shown) similar to precorrection elements 342 and 344 can be used without or in addition to frequency precorrection elements, as desired.

In FIG. 3, precorrector 342 is shown disposed in the transmission path prior to summer 336. This allows individual control over each user terminal signal as desired. However, a single frequency precorrection element can be used when precorrection is performed after summer 336, because user terminals share the same transmission path from the gateway to the satellite.

As an alternative, a precorrector 344 can be disposed in the transmission path on the output of analog transmitter 338, to adjust the frequency of the outgoing signal, using well known techniques. However, changing the frequency on the output of the analog transmitter can be more difficult, and may interfere with signal filtering processes. Alternatively, the output frequency of analog transmitter 338 can be adjusted directly by control processor 320 to provide a shifted output frequency, offset from the normal center frequency.

The amount of frequency correction imposed on the outgoing signal is based on known Doppler between the gateway and each satellite through which communication is established. The amount of shifting required to account for the satellite Doppler can be computed by control processor 320 using known satellite orbital position data. This data can be stored in, and retrieved from, one or more storage elements 346, such as lookup tables or memory elements. This data can also be provided from other data sources, as desired. A variety of well known devices such as RAM and ROM circuits, or magnetic storage devices can be used to construct storage elements 346. This information is used to establish the Doppler adjustment for each satellite being used by the gateway at a given time.

As shown in FIG. 3, a time and frequency unit (TFU) 348 provides reference frequency signals for the analog receiver 314. A Universal Time (UT) signal from a GPS receiver can be used as part of this process in some applications. It can also be employed in multiple intermediate conversion steps, as desired. TFU 348 also serves as a reference for analog transmitter 338. TFU 348 also provides timing signals to other stages or processing elements within gateway transmission and reception apparatus 300 such as the correlators in digital receivers 316A–N and 318, transmit modulator 326, and control processor 320. TFU 348 is also configured to retard or advance the relative timing of (clock) signals, under processor control, by predetermined amounts, as desired.

Figure 4:
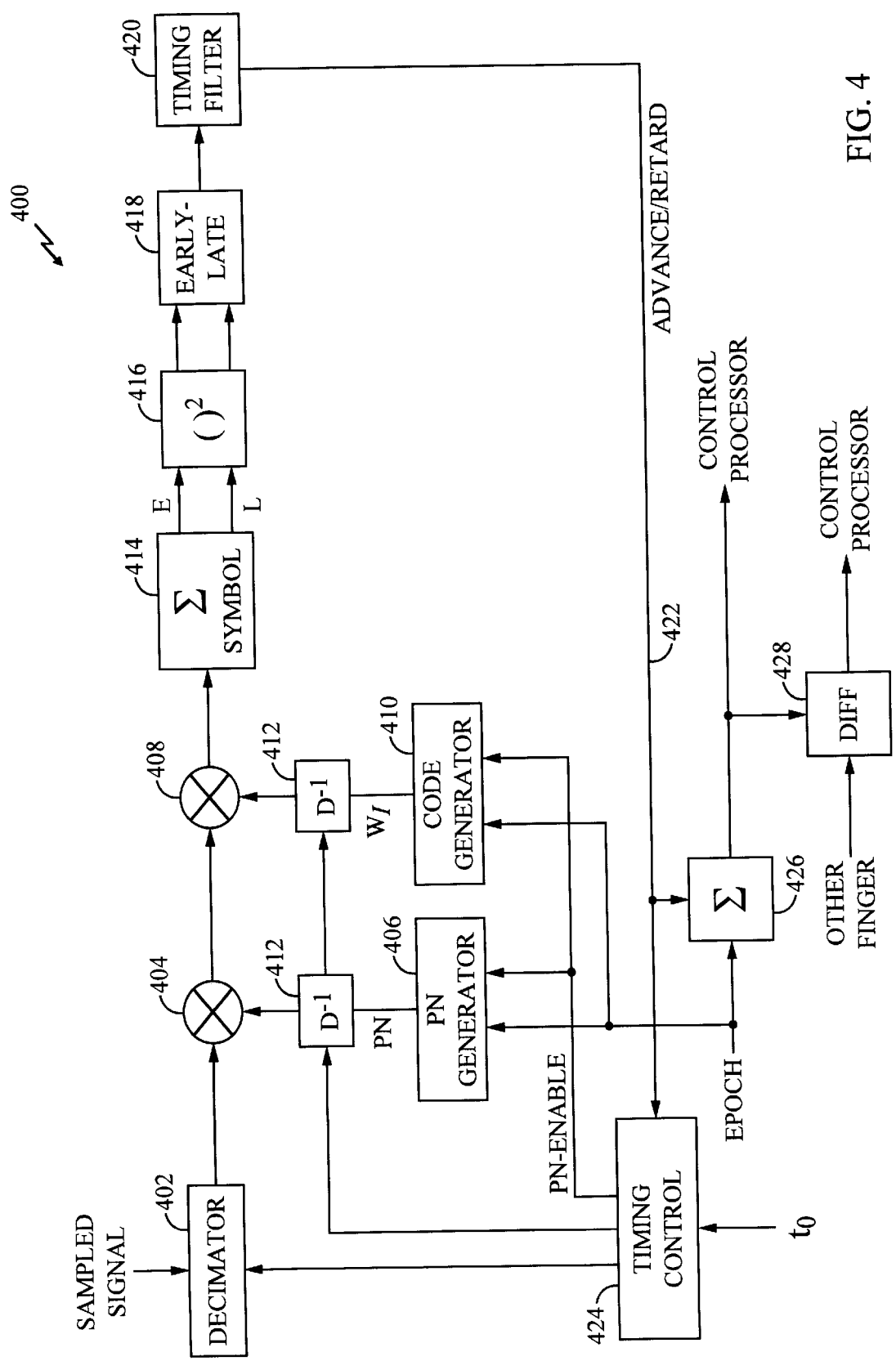
FIG. 4 is a block diagram of an exemplary time tracking loop for use in a user terminal.

One embodiment for performing timing measurements is illustrated in FIG. 4, which presents a time tracking loop 400 for a user terminal. This type of time tracking loop is referred to as a Tau Dither type, as is known in the art. In FIG. 4, incoming communication signals from the analog receiver are typically oversampled and then input to a decimator 402. The decimator 402 operates at a preselected rate and timing to transfer only certain samples to subsequent stages in the receiver.

Decimated samples are transferred to a combination element 404, typically a multiplier, for combining with appropriate system PN spreading codes, provided by a PN generator or source 406, to despread the signal. The despread signal is transferred to a combination element 408 where it is combined with appropriate orthogonal code functions $W_i$, provided by a code generator or source 410, where used, to obtain data. The orthogonal code functions are those used to create communication signal channels. Generally, pilot and paging signals are used for this process, although other strong signals could be used. Therefore, the orthogonal code is generally one used to generate a pilot or paging signal, as would be known in the art. Alternatively, PN spreading and orthogonal codes can be combined together and then combined with the samples in a single step, as is known in the art.

The time tracking circuit can employ an "Early/Late" scheme as disclosed in U.S. Pat. No. 4,901,307, discussed above. In this approach, the degree to which the timing of incoming signals and digital receivers 216 are the same, or aligned, is measured by sampling an incoming data stream at an offset from a nominal chip time. This offset is either plus or minus half a PN code chip period, and is referred to as either late or early, respectively.

If the timing of the plus or minus offset data differs symmetrically from that of the nominal despread incoming signal peaks, the difference formed between "late" and "early" sampling values is zero. That is, a value created by forming a difference between the "late" and "early" signals goes to zero when the one-half chip offset is centered about the "on-time" timing of the received signal. If the relative timing used by receivers 216 is not tracking the received signal timing accurately, and is fast relative to the incoming signal data, then the late-minus-early difference produces a correction signal with a positive value. On the other hand, if the signal timing is too slow, the difference produces a correction signal with a negative value. It is readily apparent that an inverse or other relationship can also be employed as desired.

To implement this technique, the decimator output is controlled to occur one-half chip earlier than normally used to demodulate signals. The decimator output is then despread and decoded, and the resulting data accumulated over a pre-selected period (typically a symbol period) in an accumulator 414. The accumulated symbol data provide symbol energies, which are squared in a squaring element 416 to provide non-negative magnitude values for an "early" signal.

Another set of samples is accumulated and summed, or integrated, over a subsequent pre-selected period using accumulator 414. However, during this period a set of delay elements 412 are used to delay the application of the PN and orthogonal codes by one chip period. This has the same effect as altering the timing of the samples, or decimation, producing a "late" version of the despread and decoded data. This despread and decoded data is accumulated over the pre-selected period in accumulator 414. Additional elements and storage devices can be used as desired. The accumulated late symbol data is squared in squaring element 416. The resulting early and late squared values are either subtracted from each other or compared to produce a desired Early/Late timing difference in element 418. This difference is filtered using a timing filter 420 to provide an "advance/retard" signal 422. The time tracking loop continues to alternate between using un-delayed and delayed codes to produce early and late symbols, which are used to update or generate values for "advance/retard" signal 422. This continues until the receiver timing is reset, such as when the receiver is inactivated or shifted to tracking a new signal, as would be apparent to one skilled in the relevant art.

Initial and ongoing timing control for the decimation process, and delay of codes, is provided by circuitry such as a timing control circuit 424. That is, timing control circuit 424 determines the timing of sample selection from decimator 402. At the same time, PN spreading and orthogonal code generation are also controlled by signals from timing control circuit 424. This later timing is sometimes referred to as a PN-enable since it enables application of codes. There may also be an initialization or EPOCH timing signal. The timing selected by timing control circuit 424 is adjusted by advance/retard signal 422 in response to the timing loop output. Generally, the timing is advanced by a length of time that is a fraction of a chip period, for example ⅛ of a chip where 8-times oversampling is used, to collect the input signal before decimation. The use of such timing and advance and retard mechanisms are well understood in the art.

The amount by which each finger or digital receiver adjusts its timing to synchronize or align with an input signal is used to determine relative delays in signal arrival time. This is easily accomplished by tracking the total amount of time change (advance/retard) used by timing loop 400. An accumulator 426 can be used to simply accumulate and sum each of the advance/retard signals or commands over a preselected period. This provides a total or net amount of change needed to align the incoming signal and receiver timing. This represents an offset of the signal from local user terminal or receiver timing. Where user terminal timing is relatively close to or synchronized with the gateway, this could provide a measure of the delay experienced by a signal as it transits between a gateway and user terminal, which allows computation of range. Unfortunately, many factors such as local oscillator inaccuracy or drift generally prevent such direct computations.

However, the timing adjustments from two digital receivers 216 can be used to provide a relative time of arrival difference value. Here each digital receiver is receiving a signal from either satellite 104A or 104B, and determining the timing adjustments needed to track the signal. The timing adjustment required can be provided either directly to the control processor or to a dedicated computation element where a difference is formed between the two. This difference indicates the relative time difference for the arrival of the two signals at the user terminal, which can be reported back to the gateway.

As mentioned before, this data can be sent to the gateway as part of other messages or as dedicated time information signals. The data can be stored in transient memory elements for later transfer and use. The information can also be provided or stored with some form of "time stamp" reflecting the time of collection, so that a gateway has an accurate time relationship for the data and can more accurately determine user terminal position. However, the accuracy desired in communications systems, as mentioned above, is not a very strict requirement. If the information is transmitted within a very short time from collection, time stamping is not very useful. Generally, the data is sent within a few data frames of its measurement, and if there is a transfer problem, the data is generated again before transfer so it is not more than a few frames old. However, time stamping allows more flexibility in data transmission, and repeated transfer of signals or sets of signals regardless of actual time.

Otherwise, the system is likely to use fixed timing slots and reporting requirements if time stamping is not used to maintain a desired level of accuracy.

The process is similar for signals received by a gateway, except that a pilot signal is not detected, and the orthogonal codes are generally associated with access probe signals. One advantage for a gateway is that the timing can be thought of as an absolute time reference. That is, the gateway has accurate system timing, as discussed above, and can accurately determine time differences for application of PN or orthogonal codes relative to its own time. This allows a gateway to determine accurate transit times or distances from the state of the PN codes being used for each receiver or finger. These transit times or distances can be used in determination of the range difference parameter of the present invention. Therefore, while useful in some applications, the information for each finger can be treated separately and need not be combined using an element 428, as before.

Figure 5:
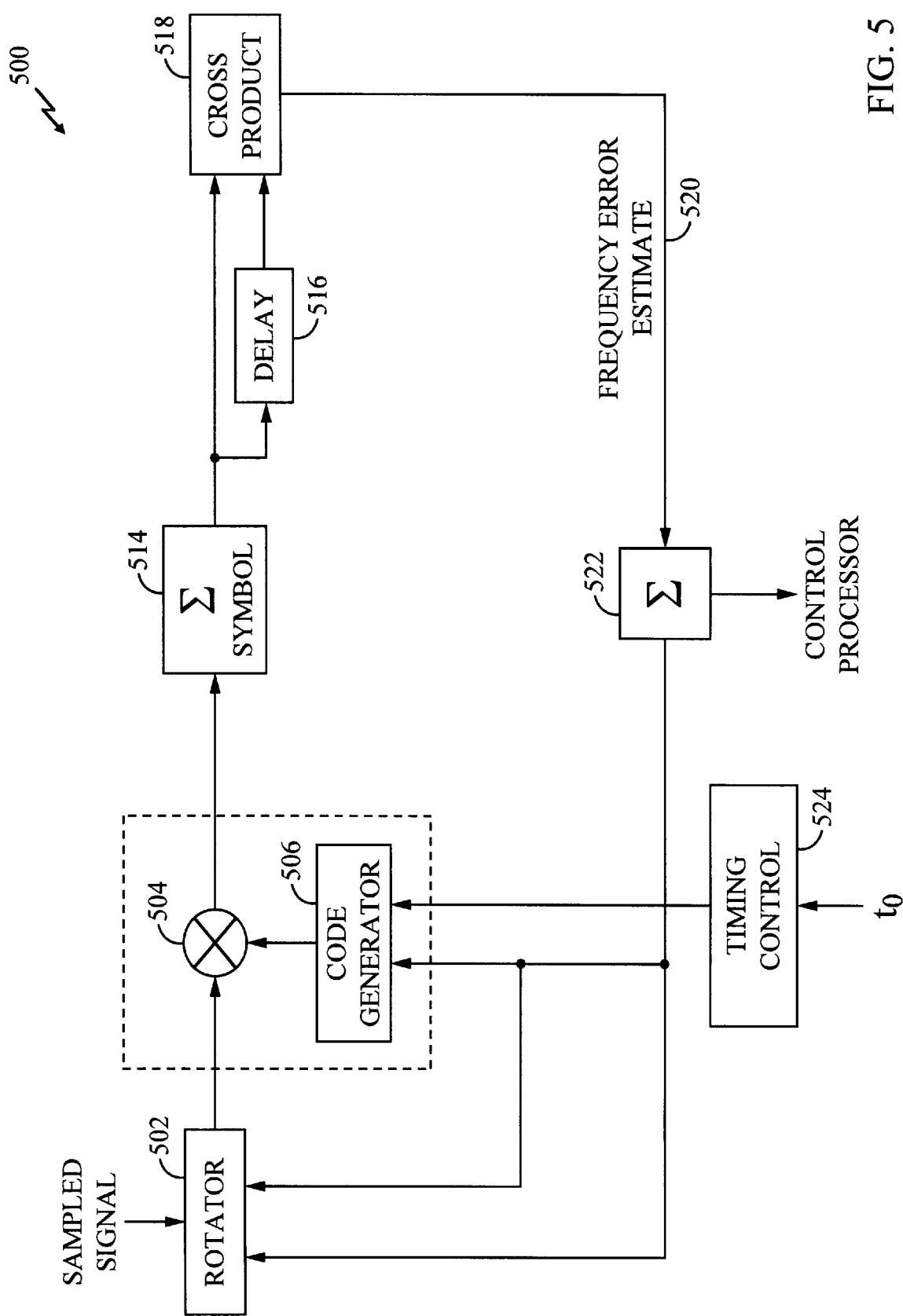
FIG. 5 is a block diagram of an exemplary frequency tracking loop for use in a user terminal.

One embodiment for performing frequency measurements is illustrated in FIG. 5, which presents an overview of a frequency tracking loop 500 for a user terminal. These frequency measurements can be used in determination of the range-rate difference parameter of the present invention. In FIG. 5, communication signals from the analog receiver are input to a rotator 502. Rotator 502 operates at a preselected but adjustable phase to remove residual frequency errors or offsets from digital samples arriving from an analog receiver at the digital receiver or finger.

When CDMA-type signals are employed, the samples can be transferred to one or more combination elements 504, typically a multiplier, for combining with appropriate system PN spreading codes provided by one or more code generators or sources 506 to obtain data. Such PN spreading and orthogonal codes can be combined with the signal either separately or together in a single step. Where traffic channels are used to adjust the frequency, a fast Hadamard transform (FHT) element may be used in place of combiner 504 and code generator 506. This technique is disclosed in U.S. patent application Ser. No. 08/625,481 entitled "*Frequency Tracking For Orthogonal Walsh Modulation*," which is assigned to assignee of the present invention and is incorporated herein by reference.

Rotated, and despread and decoded, signals are accumulated over a symbol period in accumulator 514 to provide a data symbol, and the results are provided to a vector cross product generation element or generator 518. At the same time, each symbol is provided to a one symbol time delay element 516, which provides a one symbol period delay before transferring the symbol to cross product generator 518.

Cross product generator 518 forms a vector cross product between a given symbol and the preceding symbol to determine a change in phase between the symbols. This provides a measure of error in the phase rotation imparted to the input signal. The output from cross product generator 518 is provided as a frequency error estimate or adjustment factor to rotator 502 and code generator 506.

Timing control for the despreading and decoding processes is provided by circuitry such as a timing control circuit 524, as discussed above. This timing may be provided as an output from the timing loop discussed above.

The amount by which each finger or digital receiver adjusts its phase to align with an input signal is used to determine relative frequency offsets in arriving signals. That is, the amount by which the rotator phase has to be adjusted to remove residual error in signal alignment indicates the amount by which the arriving signal frequency is offset from the expected or local reference frequency for the user terminal.

Since the communication system operates within fixed sets of frequency bands for communication signals, the receivers know the center or nominal carrier frequencies to use. However, as a result of Doppler shifts and other effects, which may be minimal, the arriving signal will not be at the expected center frequency. The adjustments discussed above define an offset, which can be used to determine the Doppler shifts and the actual frequency of the arriving signal.

This is easily accomplished by tracking the total amount of change implemented by frequency tracking loop 500. An accumulator 522 can be used to simply accumulate the phase changes from the error estimates, signals, or commands over a preselected period. This provides a total or net amount of change needed to align the incoming signal and receiver frequencies, and represents the frequency offset of the signal from local user terminal or receiver frequency, scaled to the appropriate frequency band.

As before, this data can be sent to the gateway as part of other messages or as dedicated frequency information signals. The data can be stored in transient memory for later transfer and can also be provided with some form of "time stamp". However, this is generally not necessary since data is sent within a few data frames of its measurement, and can be regenerated if there is a problem. Otherwise, the system is likely to use fixed timing slots and reporting requirements if time stamping is not used to maintain a desired level of accuracy.

III. Available Parameters

In a preferred embodiment, the present invention employs two parameters: range difference and range-rate difference. These parameters describe the spatial and temporal relationships between user terminal 106 and satellites 104A and 104B. These parameters, and their measurement and application, are described below.

Figure 6:
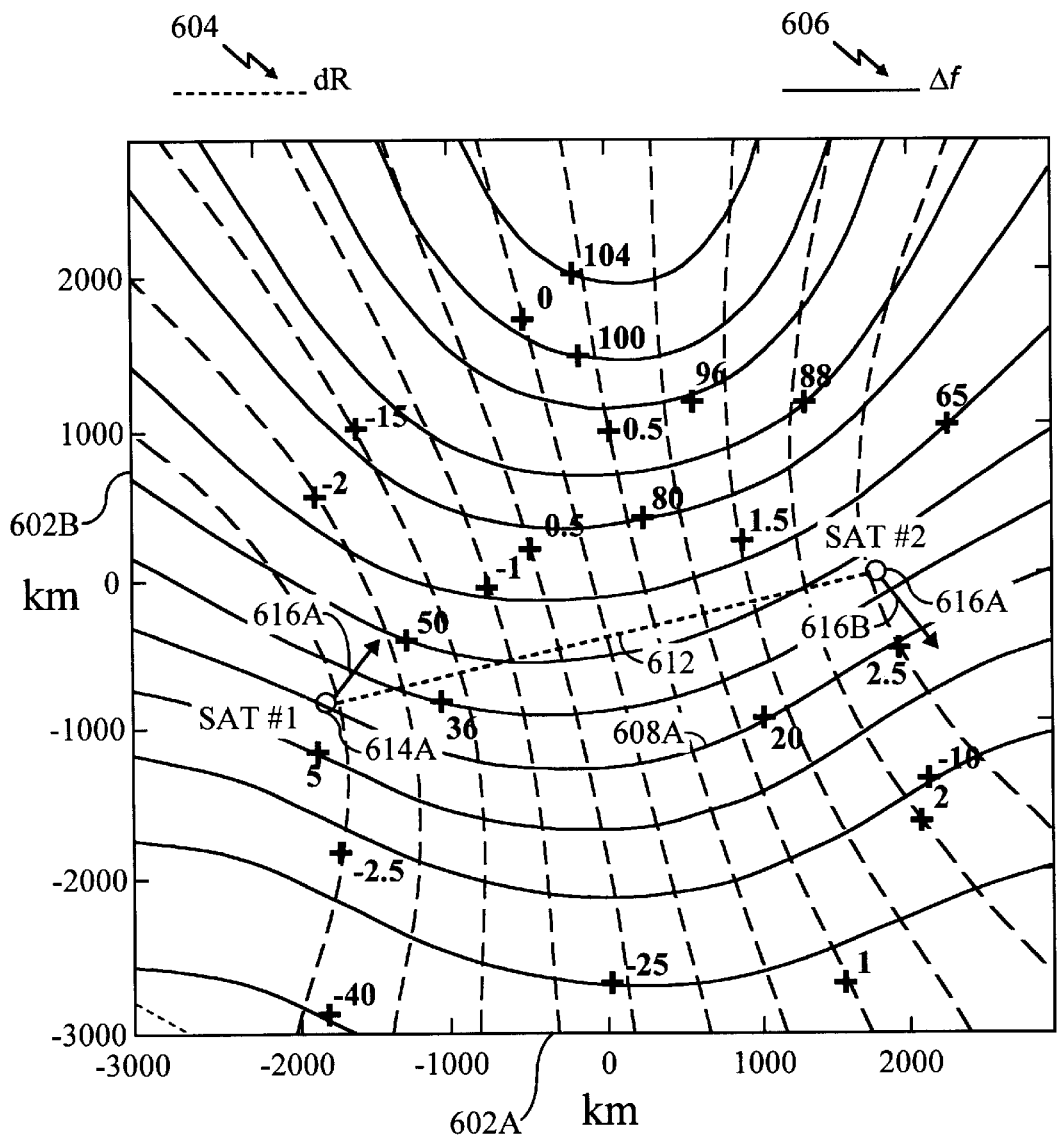
FIGS. 6 and 7 depict the sub-points of two satellites and a projection, onto the surface of the Earth, of iso-contours of range difference and range-rate difference parameters related to the satellites.
Figure 7:
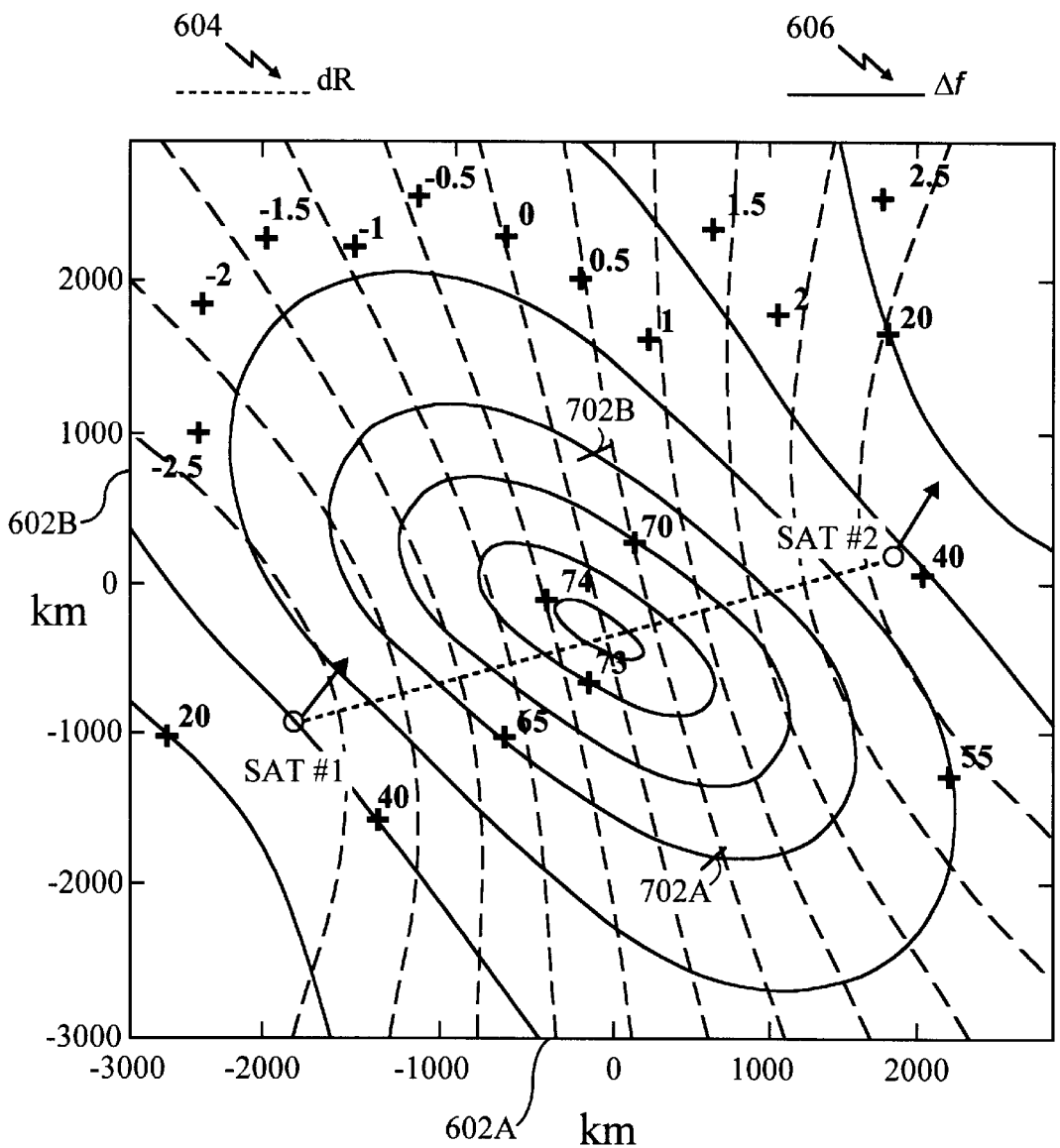

FIGS. 6 and 7 depict the projection, onto the surface of the Earth, of iso-contours representing these parameters. An iso-contour of a parameter is a curve connecting all points having the same value of the parameter. FIGS. 6 and 7 depict the sub-points 614A and 614B of two satellites 104A and 104B, respectively (that is, the points on the surface of the Earth that are directly below the satellites), and a projection, onto the surface of the Earth, of iso-contours for range difference and range-rate difference parameters related to satellites 104A and 104B. Two axes, x-axis 602A and y-axis 602B, graduated in thousands of kilometers, are provided to illustrate an example scale.

Range Difference. The range difference parameter represents the distances between a user terminal 106 and two satellites 104A and 104B. In a preferred embodiment of the present invention, the range difference parameter is the difference dR between (1) the distance between a particular user terminal 106 and a first satellite 104A and (2) the distance between that user terminal 106 and a second satellite 104B. The projection of iso-dR contours on the surface of the Earth describes a set of hyperbolas, as depicted by the dashed lines, shown generally at 604 in FIG. 6, with the dR=0 contour describing a straight line.

In a preferred embodiment of the present invention, dR is determined by the following method. First, gateway 102 transmits two signals. The first signal is transmitted through a first satellite 104A to user terminal 106, and the second signal is transmitted through a second satellite 104B to user terminal 106. In a preferred embodiment of the present invention, the first and second signals are precorrected in time at gateway 102, as described above with respect to FIG. 3, so that they are retransmitted by the first and second satellites 104A and 104B, respectively, substantially simultaneously.

Second, user terminal 106 determines a delay difference between (1) the time at which user terminal 106 received the signal from the first satellite and (2) the time at which user terminal 106 received the signal from the second satellite. This delay difference is referred to hereinafter as Δt. Finally, user terminal 106 determines dR from Δt. As would be apparent to one skilled in the relevant art, other methods can be employed to obtain dR without departing from the spirit and scope of the present invention.

In an alternative embodiment of the present invention, Δt is used as a range-difference parameter.

In a preferred embodiment of the present invention, the first and second signals are pilot signals. As would be apparent to one skilled in the relevant art, any suitable signal can be used without departing from the spirit and scope of the present invention.

In a preferred embodiment of the present invention, the first and second signals are precorrected by gateway 102, as discussed above, before transmission to ensure that the PN codes of the signals are synchronized (including appropriate PN code offsets for sub-beams) when they are retransmitted by satellites 104A and 104B, and user terminal 106 determines Δt. by comparing the states of the PN codes in the two received signals. In an alternative embodiment, the first and second signals are not precorrected in time, but the effects of the difference in retransmission times between the first and second signals are removed at gateway 102 after reception of the signals. As would be apparent to one skilled in the relevant art, other precorrection methods can be employed to compensate for the difference in path lengths between gateway 102 and satellites 104A and 104B.

Range-rate Difference. The range-rate difference (also known as Doppler-difference) parameter describes the difference between (1) the range-rate between a particular user terminal 106 and a first satellite 104A and (2) the range-rate between that user terminal 106 and a second satellite 104B. In a preferred embodiment of the present invention, the range-rate difference parameter is a difference $\Delta \dot{R}$ between (1) a relative radial velocity between a particular user terminal 106 and a first satellite 104A and (2) a relative radial velocity between that user terminal 106 and a second satellite 104B.

In an alternative embodiment of the present invention, the range-rate difference parameter is the frequency difference Δf, measured at user terminal 106, between the frequency of a signal received from gateway 102 through a first satellite 104A and the frequency of a signal received from gateway 102 through a second satellite 104B. $\Delta \dot{R}$ is related to Δf as follows: $\Delta \dot{R}$ can be calculated by multiplying Δf by the speed of light and dividing by the center carrier frequency. The projection of iso-Δf contours on the surface of the Earth describes a set of curves, as depicted by the solid lines in FIG. 6 and shown generally at 606.

In a preferred embodiment of the present invention, $\Delta \dot{R}$ is determined by the following method. First, the gateway transmits two signals. The first signal is transmitted through a first satellite 104A to user terminal 106, and the second signal is transmitted through a second satellite 104B to that user terminal 106. In a preferred embodiment of the present invention, the frequencies of the first and second signals are precorrected at gateway 102, as discussed above, so that the signals retransmitted by the first and second satellites 104A and 104B have the same frequency.

Second, user terminal 106 determines the difference between (1) the frequency of the signal received from the first satellite and (2) the frequency of the signal received from the second satellite. This frequency difference is $\Delta f$. Finally, user terminal 106 calculates $\Delta \dot{R}$ by multiplying $\Delta f$ by the speed of light and dividing the result by the center carrier frequency of the first and second signals. As would be apparent to one skilled in the relevant art, other methods can be employed to obtain $\Delta \dot{R}$ without departing from the spirit and scope of the present invention.

In a preferred embodiment of the present invention, the first signal is precorrected by gateway 102 prior to transmission by adjusting the signal's frequency to compensate for the Doppler shift caused by the known relative motion between first satellite 104A and gateway 102, and the second signal is precorrected in a similar manner. In an alternative embodiment, neither signal is frequency precorrected. As would be apparent to one skilled in the relevant art, other precorrection methods can be employed to compensate for the motion of satellites 104A and 104B.

In a preferred embodiment of the present invention, the first and second signals are pilot signals. As would be apparent to one skilled in the relevant art, any suitable signal can be used without departing from the spirit and scope of the present invention.

IV. Positioning Method

The parameters described above can be used to determine the position of a user terminal 106. As an aid to understanding the present invention, physical representations of the parameters are presented as iso-parameter contours projected onto the surface of the Earth.

In a preferred embodiment of the present invention, position determination is based on the range difference and range-rate difference parameters. In FIG. 6, the range difference parameter is dR and the range-rate difference parameter is $\Delta f$. FIG. 6 depicts the sub-points 616A and 616B of two satellites 104A and 104B, respectively, and a projection, onto the surface of the Earth, of iso-contours of the dR and $\Delta f$ parameters related to satellites 104. An iso-contour of a parameter is a curve connecting all points having the same value of the parameter. Two axes, x-axis 602A and y-axis 602B, graduated in thousands of kilometers, are provided to illustrate an example scale.

FIG. 6 depicts a family of iso-dR contours as dashed lines, as shown generally at 604. Each iso-dR contour is a hyperbola connecting all points having the same value of dR, and intersects a baseline 612 (that is, a line connecting the sub-points 614 of satellites 104) at a 90° angle. In FIG. 6, the dR contours are graduated in thousands of kilometers. The dR=0 contour is a normal bisector of baseline 612. The dR=+0.5 contour, immediately to the right of the dR=0 contour, connects all points for which the range to satellite 104A exceeds the range to satellite 104B by 500 km.

FIG. 6 also depicts the $\Delta f$ parameter as a family of curves, shown generally at 606 as solid lines graduated in kHz. The shape of the $\Delta f$ curves is a function of the relative velocity of satellites 104A and 104B. Representative velocity vectors of satellites 104A and 104B are depicted generally at 616A and 616B as arrows extending along the line of travel. The area of maximum $\Delta f$ is found near the top of FIG. 6, where the sub-tracks (that is, the lines connecting the sub-points) of satellites 104A and 104B intersect.

In a typical case, such as that depicted in FIG. 6, satellites 104 are not traveling in parallel paths, and thus a dR contour and a $\Delta f$ contour will intersect only once, and at near right angles, in the vicinity of a user terminal 106. This provides an accurate, unambiguous position solution.

For example, if dR=+500 km and $\Delta f$=+20 kHz, then user terminal 106 is at position 608A in FIG. 6.

In another case, however, a dR contour will intersect a $\Delta f$ contour twice, or a dR contour will be tangential, or nearly tangential, to a $\Delta f$ contour in the vicinity of a user terminal 106. This geometry results when the velocity vectors of satellites 104 are parallel, or nearly parallel, causing the $\Delta f$ contours in the vicinity of user terminal 106 to be closed, as shown in FIG. 7. For example, referring to FIG. 7, when the measured parameters are dR=+500 km and $\Delta f$=+65 kHz, the solution is ambiguous because these contours intersect at two points 702A and 702B. This problem is referred to as "position ambiguity".

As a further example, when the measured parameters are dR=−1000 km and $\Delta f$=+73 kHz, the solution is very sensitive to error, because these contours are nearly tangential, as shown at point 702C. Thus, a small error in either parameter will result in a large position error. This problem is referred to as a Geometric Dilution of Precision (GDOP) singularity. Both of these problems can be mitigated by a technique known as "distance-based registration", described below.

Figure 8:
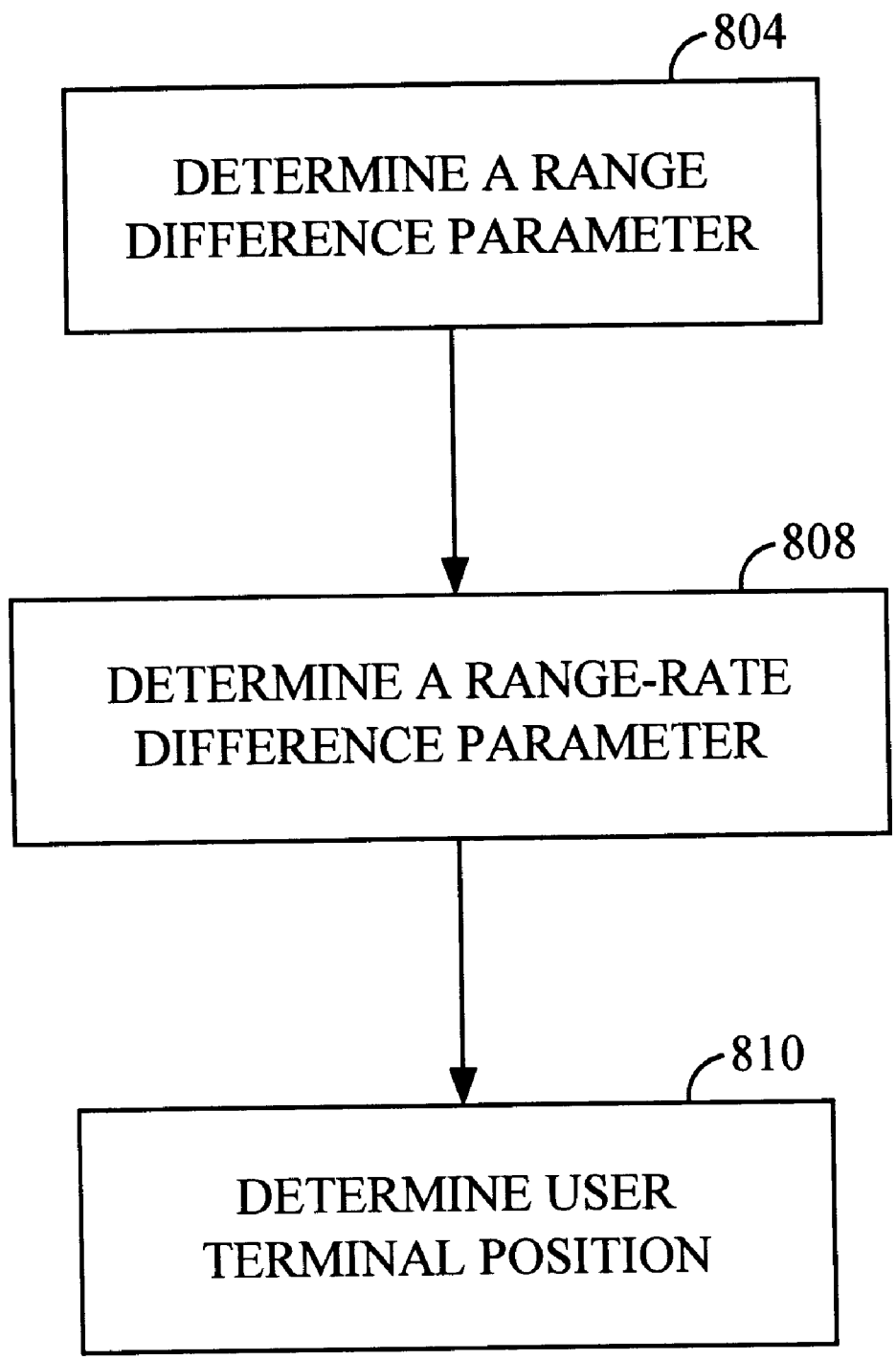
FIG. 8 is a flowchart depicting the operation of a preferred embodiment of the present invention.

FIG. 8 is a flowchart depicting the operation of a preferred embodiment of the present invention. One or more range difference parameters are determined, as described above and shown in a step 804. One or more range-rate difference parameters are determined, as described above and shown in a step 808. Then, the position of the user terminal on the Earth's surface is determined based on the known positions and velocities of the satellites and the range difference and range-rate difference parameters, as shown in a step 810 and described below.

V. Positioning Execution

Figure 9:
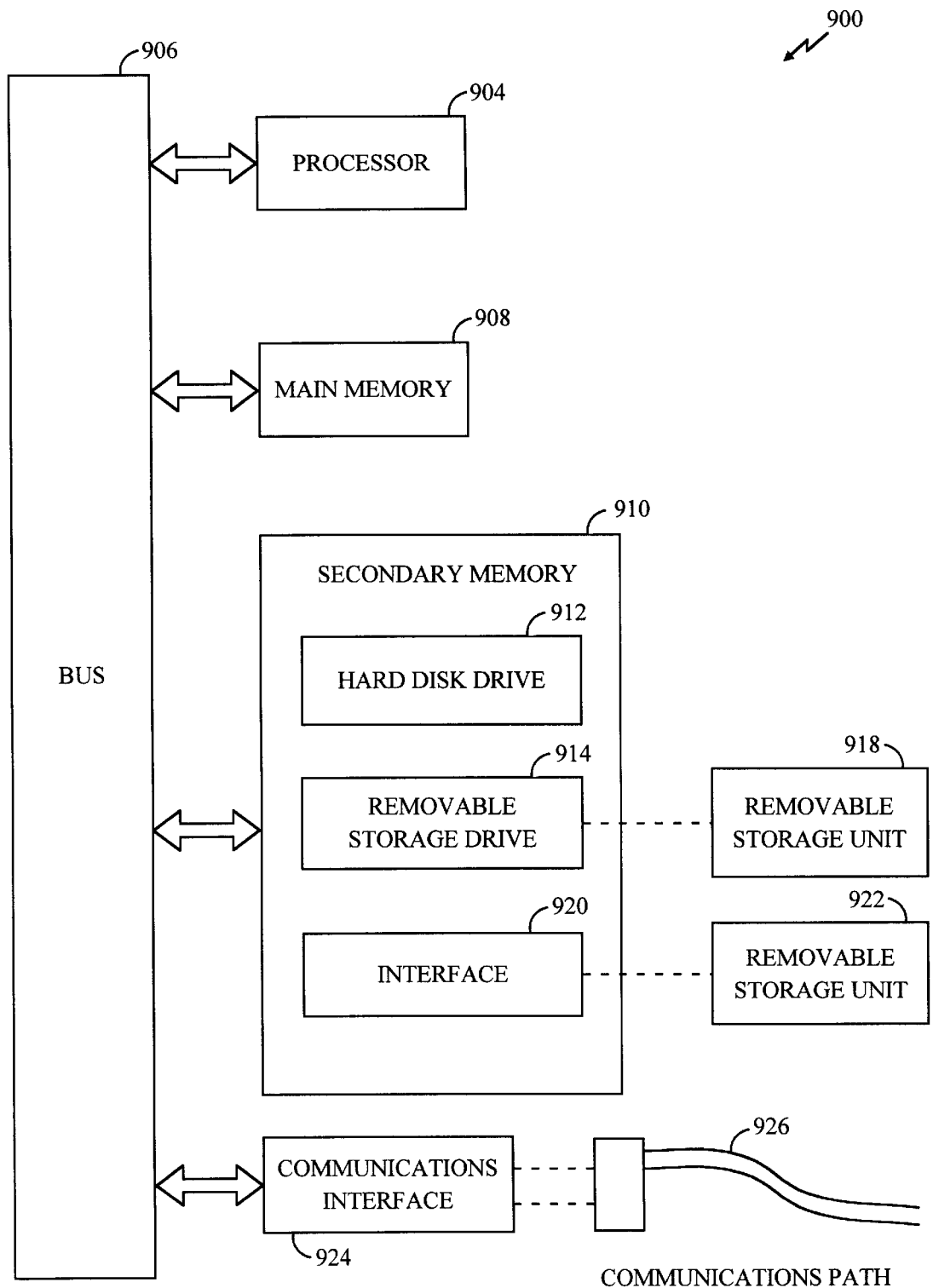
FIG. 9 is a block diagram illustrating an exemplary environment in which the present invention can operate.

Before describing positioning execution in detail, it is useful to first describe an exemplary environment in which the positioning method of the present invention can operate. FIG. 9 is a block diagram illustrating such an example environment. The environment is a computer system 900 that can form a part of control processor 220 and/or control processor 320. Computer system 900 includes one or more processors, such as processor 904. The processor 904 is connected to a communications bus 906. Various embodiments are described in terms of this example computer system. After reading this description, it will be apparent to a person skilled in the relevant art how to implement the positioning method of the present invention using other computer systems, computer architectures, hardware state machines, look-up tables, and the like, and various combinations thereof.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices through communications path 926. Examples of communications interface 924 can include a modem, a network interface (such as an Ethernet card), a communications port, etc. Software and data transferred through communications interface 924 are in the form of signals which can be electronic, electromagnetic, optical or other signals capable of being received by communications interface 924 through communications path 926.

The operation of the positioning method of the present invention is described in terms of this example environment. Description in these terms is provided for convenience only. It is not intended that the operation of the positioning method of the present invention be limited to application in this example environment. In fact, after reading the following description, it will become apparent to a person skilled in the relevant art how to implement the positioning method of the present invention in alternative environments.

In one embodiment of the present invention, the position of user terminal 106 is determined by executing the positioning method described below on computer system 900. As would be apparent to one skilled in the relevant art, the positioning method can be executed by a hardware state machine, look-up tables, or the like without departing from the spirit and scope of the present invention.

An M×1 vector of parameters denoted z is constructed that consists of the M parameters to be used in position determination. Vector z can include one or more of each of the parameters described above. As is well-known in the art, the parameters are non-linear functions of the 2-dimensional user terminal position vector x, $$x=[\text{lat long}]^T \tag{1}$$

where the "T" superscript indicates the transpose of a matrix or vector, according to:

$$z=h(x)+v \tag{2}$$

where the M×1 vector v represents the measurement errors, and h is the non-linear function which describes the relationship between the measured parameters and the position of user terminal 106. h is also a function of the positions and velocities of satellites 104A and 104B. In an alternate embodiment, the user terminal position vector x can be defined by three Cartesian coordinates, rather than by latitude and longitude, as shown in equation (3).

$$x=[x\ y\ z]^T \tag{3}$$

According to Gauss' method of linearization, a M×K partial derivative matrix H is constructed to solve for the position of user terminal 106, where K is the number of position unknowns, and whose (m,k) element is the partial derivative of the mth measurement with respect to the kth position parameter, determined at a given position x. For example, if the position vector describes latitude and longitude, as in equation (1), then K equals 2 and the elements in the k=1 column of the matrix H describe the partial derivatives with respect to the latitude of user terminal 106 and the elements in the k=2 column describe the partial derivatives with respect to the longitude of user terminal 106. If the position vector is in Cartesian coordinates (K=3), the k=(1,2,3) columns of H refer to (x,y,z) coordinates, respectively. When Cartesian coordinates are used, an additional equation is used to indicate that the sum of the squares of the coordinates is the square of the radius of the Earth. The relationship between x and H is given by:

$$H = H(x) = \frac{\partial h}{\partial x}(x) \tag{4}$$

An iterative weighted least-squares method is used to solve for the unknown position parameters. In a preferred embodiment of the present invention, the method employed is the weighted Gauss-Newton method disclosed by H. W. Sorenson in *Parameter Estimation—Principles and Problems*, New York, Marcel Dekker, 1980. The iterative equation is given by the relationship:

$$\hat{x}_{i+1}=\hat{x}_i+(\hat{H}^T W \hat{H})^{-1}\hat{H}^T W(z-\hat{z}) \tag{5}$$

where $\hat{x}_i$ and $\hat{x}_{i+1}$ are the current and next position estimates, respectively, and W is a M×M weight matrix. The subscript i represents the iteration number, with i=0 representing the first iteration. Matrices or vectors based on a position estimate are indicated by a "^" superscript. A reference point, such as the last-known position of user terminal 106, is selected as an initial position estimate. If no last position is known, any position, such as the position of gateway 102, can be used.

$$\hat{H}=H(\hat{x}_i) \tag{6}$$

is the partial derivative matrix determined at the current position estimate, and $$\hat{z}=h(\hat{x}_i) \tag{7}$$

are the expected error-free parameters, determined using the current position estimate. The iterations terminate when the difference between $\hat{x}_i$ and $\hat{x}_{i+1}$ falls below a predetermined threshold. The threshold is determined by system designers and/or operators based on system accuracy, as would be apparent to one skilled in the relevant art. For example, the threshold can be based on the chip accuracy of the measurements and the chip rate.

The elements of the M×M weight matrix W provide means to emphasize the influence of specific parameters upon the estimated position $\hat{x}$ when there are more parameters than unknowns. In a preferred embodiment, weight matrix W is a diagonal matrix whose elements reflect the relative accuracy with which each parameter can be determined. Thus, the values of the elements are set based on the known measurement accuracies of the system as would be apparent to those skilled in the relevant art. Therefore, a parameter based on a very accurate measurement is given more significance than a parameter which cannot be measured as accurately. The elements of the weight matrix are initialized to predetermined values, but can be adjusted dynamically. Optimal accuracy is obtained if the weight matrix is chosen as the inverse of the measurement error covariance matrix.

If the measurement errors are mutually independent with zero mean and variances:

$$\sigma^2_m, m=1, 2, \ldots, M \tag{8}$$

then W is a diagonal matrix with $\sigma^{-2}_m$ as its diagonal elements.

With this choice of W the variance of the kth element of the estimated position vector x is given by:

$$\sigma^2_k = (H^T W H)^{-1}_{k,k}, \quad k=1,2. \tag{9}$$

Finally, the combined theoretical horizontal position error, in units of distance, is given by:

$$\sigma_{pos} = R_E \sqrt{\sigma^2_{k=1} + \sigma^2_{k=2} \cos^2(lat)} \tag{10}$$

where $R_E$ is the Earth radius.

In a preferred embodiment, the positioning method employs a smooth ellipsoid model for the Earth's surface. In an alternate embodiment, the positioning method initially employs a smooth ellipsoid model for the Earth's surface such as the WGS-84 Earth model. When the values of x converge so that difference between $\hat{x}_i$ and $\hat{x}_{i+1}$ is less than a predetermined threshold, a detailed digital terrain model is substituted for the smooth model, and the iterations continue until the values of x converge so that the difference between $\hat{x}_i$ and $\hat{x}_{i+1}$ is less than a second predetermined distance threshold. Thus, any errors introduced by the elevation of user terminal 106 are mitigated. In an alternative embodiment, the detailed digital terrain model is substituted after a predetermined number of iterations. The values of the distance thresholds and the number of iterations described above are determined according to various factors, as would be apparent to one skilled in the relevant art.

VI. Distance-based Registration

In a preferred embodiment, the present invention is employed as part of a method known as "distance-based registration" to track the position of a mobile or portable user terminal 106. According to this method, user terminal 106 determines its position passively, as described above, at regular intervals. When user terminal 106 determines that its position has changed substantially from the last actively-determined position, it "registers" with gateway 102. In response to the registration, gateway 102 initiates active position determination. The duration of these intervals, and the magnitude of position change that will trigger a report, are selected according to various factors, such as user terminal velocity, proximity to important boundaries (such as the political boundaries and service area boundaries discussed above) and the like, as would be apparent to one skilled in the relevant art. In a preferred embodiment, these factors are downloaded to user terminal 106 by gateway 102, and can be modified to effect an increase or decrease in positioning accuracy as the user terminal approaches or withdraws from a boundary. In this manner, satellite communications system 100 maintains timely and accurate position information for user terminal 106 without requiring user terminal 106 to make unnecessary transmissions.

When user terminal 106 determines its position passively, it begins with its last determined position as an estimate of its current position, as described above. This will generally resolve a significant position ambiguity, but will not always resolve a GDOP singularity. Because the position information is not required immediately, user terminal 106 can simply wait a short time for the rapidly-changing geometry of satellites 104 to improve, and repeat the measurement. This process can be repeated until an accurate measurement is obtained.

Figure 10:
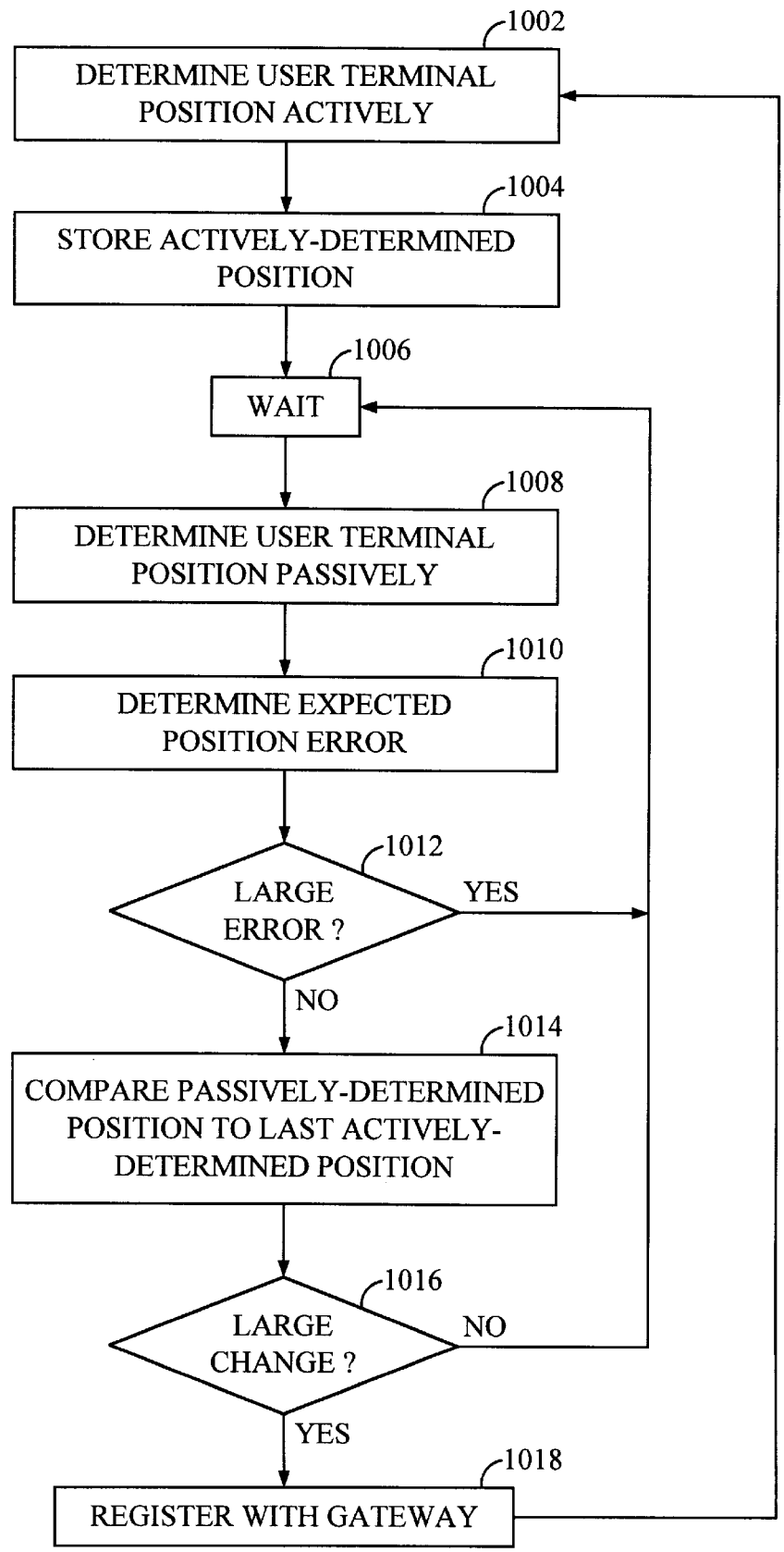
FIG. 10 depicts a flowchart describing the operation of distance-based registration according to a preferred embodiment of the present invention.

FIG. 10 is a flowchart describing the operation of distance-based registration according to a preferred embodiment of the present invention. The process begins when the position of a user terminal 106 is determined actively, as shown in a step 1002. In a preferred embodiment of the present invention, when two or more satellites 104 are available, active position determination is accomplished as disclosed in a commonly-owned copending application entitled "*Unambiguous Position Determination Using Two Low-Earth Orbit Satellites*" having application number (to be assigned, Attorney Docket Number PA278), which is incorporated herein by reference. When only one satellite 104 is available, active position determination is accomplished as disclosed in a commonly-owned copending application entitled "*Position Determination Using One Low-Earth Orbit Satellite*" having application number (to be assigned, Attorney Docket Number PA286), which is incorporated herein by reference. As would be apparent to one skilled in the relevant art, other methods of active position determination can be used with the distance-based registration of the present invention. In a step 1004, user terminal 106 stores the actively-determined position.

After a predetermined period of time elapses, as shown in a step 1006, user terminal 106 determines its position passively, as discussed above and shown in a step 1008. User terminal 106 then determines the expected position error $\sigma_{pos}$, as described above with reference to equation (10), and as shown in a step 1010. If the expected position error is large, as indicated by the "Y" branch from step 1012, then user terminal 106 waits for another interval, as shown in a step 1006, before again passively determining its position.

In a preferred embodiment of the present invention, whether the expected position error is large is determined by comparing it to a predetermined threshold. In a preferred embodiment, the threshold can be adjusted to compensate for various bias errors. For example, the threshold may be adjusted to compensate for bias error introduced by the velocity of user terminal 106.

However, if the expected position error is not large, as indicated by the "N" branch from step 1012, then the passively-determined position is compared to the last actively-determined position, as shown in a step 1014. If the difference between the compared positions is large, as indicated by the "Y" branch from step 1016, then user terminal 106 informs gateway 102, as shown in a step 1018. This process is known as "registration." In response, gateway 102 initiates active position determination, as shown in a step 1002.

However, if the difference between the compared positions is not large, as indicated by the "N" branch from step 1016, then user terminal 106 waits for another interval, as shown in a step 1006, before again passively determining its position.

VII. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What I claim as my invention is:

1. A position determining system for a satellite communications system, comprising:
   a user terminal;
   at least two satellites with known positions and known velocities;
   a gateway for communicating with said user terminal through said satellites;

range difference parameter determining means for determining a range difference parameter that represents a difference between (1) the distance between one of said satellites and said user terminal and (2) the distance between another of said satellites and said user terminal;

range-rate difference parameter determining means for determining a range-rate difference parameter that represents a difference between (1) a relative radial velocity between one of said satellites and said user terminal and (2) a relative radial velocity between another of said satellites and said user terminal; and position determining means for determining the position of said user terminal on the Earth's surface based on said known positions and velocities of said satellites, said range difference parameter, and said range-rate difference parameter.

2. The position determining system of claim 1, wherein said range difference parameter represents a delay difference, further comprising:

delay difference measuring means in said user terminal for measuring a delay difference between a first signal received from said gateway through a first one of said satellites and a second signal received from said gateway through a second one of said satellites.

3. The position determining system of claim 2, wherein at least one of said first and second signals is precorrected in time to compensate for delays associated with the difference between (a) the distance between said gateway and said first one of said satellites and (b) the distance between said gateway and said second one of said satellites.

4. The position determining system of claim 1, wherein said range-rate difference parameter represents a frequency difference, further comprising:

frequency difference measuring means in said user terminal for measuring a frequency difference between a frequency of a first signal received from said gateway through a first one of said satellites and a frequency of a second signal received from said gateway through a second one of said satellites.

5. The position determining system of claim 4, wherein at least one of said first and second signals is precorrected in frequency to compensate for Doppler shift caused by the difference between (a) a relative radial velocity between said gateway and said first one of said satellites and (b) a relative radial velocity between said gateway and said second one of said satellites.

6. The position determining system of claim 1, wherein said position determining means comprises:

means for generating a M×1 parameter vector z comprising said parameters, wherein M is the number of parameters determined;

means for generating a position vector x representing an initial reference point;

means for generating a partial derivative matrix H containing information regarding said known positions and velocities of said satellites and an Earth model describing the shape of the Earth wherein the relationship between x and H is given by:

$$H = H(x) = \frac{\partial h}{\partial x}(x)$$

means for generating a M×M weight matrix W to emphasize the influence of specific parameters; and means for executing the iterative equation:

$$\hat{x}_{i+1} = \hat{x}_i + (\hat{H}^T W \hat{H})^{-1} \hat{H}^T W (z - \hat{z})$$

wherein $\hat{x}_i$ and $\hat{x}_{i+1}$ are the current and next position estimates, respectively, and i represents the iteration number, until the difference between $\hat{x}_i$ and $\hat{x}_{i+1}$ falls below a first predetermined threshold.

7. The position determining system of claim 6, wherein said weight matrix W is the inverse of the measurement error covariance matrix.

8. In a communications system comprising a user terminal, at least two satellites with known positions and known velocities, and a gateway for communicating with the user terminal through the satellites, a method for determining the position of the user terminal, comprising the steps of:

(a) determining a range difference parameter that represents a difference between (1) the distance between one of the satellites and the user terminal and (2) the distance between another of the satellites and the user terminal;

(b) determining a range-rate difference parameter that represents a difference between (1) a relative radial velocity between one of the satellites and the user terminal and (2) a relative radial velocity between another of the satellites and the user terminal; and (c) determining the position of the user terminal on the Earth's surface based on the known positions and known velocities of the satellites, said range difference and said range-rate difference.

9. The method of claim 8, wherein said range difference parameter represents a delay difference, wherein step (b) further comprises the step of:

(i) measuring, at the user terminal, a delay difference between a first signal received from the gateway through a first one of the satellites and a second signal received from the gateway through a second one of the satellites.

10. The method of claim 9, wherein at least one of said first and second signals is precorrected in time to compensate for delays associated with the difference between (a) the distance between the gateway and said first one of the satellites and (b) the distance between the gateway and said second one of the satellites.

11. The method of claim 8, wherein step (c) further comprises the steps of:

(i) transmitting a first signal from the gateway to the user terminal through a first one of the satellites and transmitting a second signal from the gateway to the user terminal through a second one of the satellites; and (ii) measuring, at the user terminal, a frequency difference between a frequency of said first signal and a frequency of said second signal, wherein said range-rate difference parameter represents said frequency difference.

12. The method of claim 11, wherein at least one of said first and second signals is precorrected in frequency to compensate for Doppler shift caused by the difference between (a) a relative radial velocity between the gateway and said first one of the satellites and (b) a relative radial velocity between the gateway and said second one of the satellites.

13. In a communications system comprising at least two satellites with known positions and known velocities and a gateway for communicating with user terminals through the satellites, a user terminal comprising:

range difference parameter determining means for determining a range difference parameter that represents a difference between (1) the distance between one of the satellites and the user terminal and (2) the distance between another of the satellites and the user terminal; and range-rate difference parameter determining means for determining a range-rate difference parameter that represents a difference between (1) a relative radial velocity between one of the satellites and the user terminal and (2) a relative radial velocity between another of the satellites and the user terminal;

wherein the position of the user terminal on the Earth's surface can be determined based on the known positions and known velocities of the satellites, said range difference parameter, and said range-rate difference parameter.

14. In a communications system comprising a user terminal, at least two satellites, and a gateway for communicating with the user terminal through the satellites, a method for maintaining, at the gateway, the position of the user terminal, comprising the steps of:

(a) actively determining the position of the user terminal;

(b) storing said actively-determined position at the user terminal;

(c) after a predetermined interval, passively determining, at the user terminal, the position of the user terminal;

(d) determining the expected error in said passively-determined position;

(e) determining a difference between said actively-determined position and said passively-determined position when said expected error does not exceed a first predetermined threshold; and (f) informing the gateway when said difference exceeds a second predetermined threshold.

15. The method of claim 14, further comprising the step of:

(g) performing steps (c) through (e) when said expected error exceeds said first predetermined threshold.

16. The method of claim 14, further comprising the step of:

(h) performing steps (c) through (f) when said difference does not exceed said second predetermined threshold.

17. The method of claim 14, wherein said first predetermined threshold has been adjusted to compensate for bias errors.

18. In a communications system comprising a user terminal, at least two satellites, and a gateway for communicating with the user terminal through the satellites, a system for maintaining, at the gateway, the position of the user terminal, comprising:

means for actively determining the position of the user terminal;

means for storing said actively-determined position at the user terminal;

means for passively determining the position of the user terminal after a predetermined interval;

means for determining the expected error in said passively-determined position;

means for determining a difference between said passively-determined position and said actively-determined position when said expected error does not exceed a first predetermined threshold; and means for informing the gateway when said difference exceeds a second predetermined threshold.

19. The system of claim 18, wherein said first predetermined threshold has been adjusted to compensate for bias errors.

* * * * *